United States Patent
Olpe

(10) Patent No.: US 6,381,223 B1
(45) Date of Patent: Apr. 30, 2002

(54) RING-BUS TECHNOLOGY

(75) Inventor: Peter R. Olpe, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/330,438

(22) Filed: Jun. 11, 1999

(51) Int. Cl.$^7$ .............................. H04L 12/28; H03K 9/00
(52) U.S. Cl. ....................... 370/285; 370/285; 370/316; 370/401; 370/424; 370/404; 375/316; 375/340
(58) Field of Search .................... 370/404, 285, 370/315, 316, 401, 402, 403, 405, 406, 424, 428, 452, 460, 323, 325; 375/316, 340, 324

(56) References Cited

U.S. PATENT DOCUMENTS

| | | | |
|---|---|---|---|
| 4,145,573 A | | 3/1979 | Arnold ........................ 370/323 |
| 5,608,722 A | * | 3/1997 | Miller ......................... 370/320 |
| 5,835,487 A | * | 11/1998 | Campanella ................ 370/316 |
| 6,061,562 A | * | 5/2000 | Martin et al. ............... 455/431 |
| 6,115,371 A | * | 9/2000 | Berstis et al. ............... 370/345 |
| 6,240,075 B1 | * | 5/2001 | Takahashi et al. .......... 370/325 |
| 6,266,339 B1 | * | 7/2001 | Donahue et al. ............ 370/432 |

FOREIGN PATENT DOCUMENTS

EP 0888844 A2 12/1998

OTHER PUBLICATIONS

Institute of Electrical Engineers, Stevenage, GB; Lenart J. M. et al: "A Ring Based Satellite Switch" Database accession No. 2577216 XP00214563 International Communications & Energy Conference (CAT. NO. 84CH2041–2), Montreal, Que., Canada, Oct. 2–4 1984, pp. 216–223, 1984, New York, NY, USA IEEE.

Cohen R. et al: "A New Protocol for Route Discovery in Multiple–Ring Networks: Part 1—The Basic Protocol" IEEE Transactions on Communications, US, IEEE Inc. New York, vol. 42, No. 2/03/04, Feb. 1 1994, pp. 488–498, XP000445955 ISSN: 0090–6778, p. 488, left–hand column, para. 1 right–hand column, para. 4; figures 1,2.

Stewen C: "Optimum Fiber Optic Networking for Profibus" Engineering and Automation, De, Siemens Aktiengesellschaft, Berlin, vol. 17, No. 3/ 04, May 1 1995, pp. 13–14, XP000533392 ISSN: 0939–2068, the whole document, fig. 2.

(List continued on next page.)

*Primary Examiner*—Seema S. Rao
*Assistant Examiner*—Phirin Sam
(74) *Attorney, Agent, or Firm*—McAndrews, Held & Malloy, Ltd.

(57) ABSTRACT

A ring-bus transition 100 is provided which for switching signals between inputs 140–144 and outputs 180–85. First, signals are received at a number of inputs 140–144. Each input is coupled to a demod 130–134. Each demod is coupled to a communication ring 151–160 which is in turn coupled to a bridge 190. Signals received at the inputs 140–144 are demodulated at the demods 130–134 and then sent via the communication rings 151–160 to the bridge 190. The bridge relays the signals to a communication bus 195 which in turn relays the signals to output processors 170–175. Each output processor 170–175 may receive and stores signals destined for it in a memory queue 230. The signals may then be output in the order they arrive or in some other order based on a priority signal. Additionally, each communication ring 151–160 may be closed by connecting the bridge 190 to the first input on each loop. Closing the loop allows each input to perform error checking on the transmitted signal and, in the case of an error, re-transmit or transmit an error message.

20 Claims, 4 Drawing Sheets

OTHER PUBLICATIONS

Institute of Electrical Engineers, Stevenage, GB; Gailat C: "The design of a parallel processor for image processing on–board satellites: an application oriented approach" Database accession No. 2127023 XP002145663, abstract, & 10th Annual International Conference on Computer Architecture Conference Proceedings, Stockholm, Sweden, Jun. 13–16 1983, pp. 379–386, 1983, New York, NY, USA, IEEE, ISBN: 0–89791–101–6.

Izhak Rubin, "Multiple Access Methods for Communications Networks", 1997.

* cited by examiner

RING-BUS TECHNOLOGY

BACKGROUND OF THE INVENTION

The present invention generally relates to a transition between a ring data transfer architecture and a bus data transfer architecture. More particularly, the present invention relates to a ring-bus transition wherein the electronic signals carried by a ring architecture are coupled or "bridged" onto a large bus architecture.

Numerous commercial and military applications require switching and/or routing large quantities of information. This is especially true for satellite-based applications. For example, a commercially viable satellite needs to support information rates of up to or greater than 10 gigabits per second to perform competitively. In satellite applications particularly, a need exists for an architecture to perform this switching while minimizing the size, weight, and power of the switch. Additionally, the architecture must provide a high degree of reliability.

Both ring communication architectures and bus communication architectures exist in the art. In a ring architecture, a number of communication nodes are connected in sequence, often with a connection from the last node back to the first node to complete the ring. Each node shares a single communication link with the previous node in the sequence and a single communication node with the next node in the sequence. Each node receives data from previous nodes and re-transmits this data, along with any new data it may be adding, to the next node in the sequence.

In a bus architecture, signals are broadcast to all the nodes on the bus at the same time. Each node monitors the broadcast signals and receives only signals intended for that node. By broadcasting to all nodes, the bus architecture eliminates the re-transmission and inter-node communication of a ring architecture.

A satellite includes a number of input nodes receiving signals and a number of output nodes transmitting signals. Signals may be transmitted to and from the earth or another satellite, for example. For the received signals to travel to their desired outputs, they must be routed. In the past, ring or bus architectures, for example have been employed to route received signals. However, both rings and buses have disadvantages when implemented in a satellite environment.

Forming a single large ring with all inputs and outputs requires a great deal of power, which is at a premium in satellite applications. Additionally, such a system requires greater bandwidth than is presently feasible with a ring system. Conversely, implementation of a bus architecture sufficient to provide the desired bandwidth yields a bus that is far to large and weighty to be installed in the space environment.

Prior systems use crossbar or similar switches to overcome these limitations. However, crossbar switches may be technically challenging to build and control and may also suffer from performance issues (e.g., switch contention). Additionally, the crossbar system may be difficult to scale to high capacity switching. Also, reliability (including fault tolerance) issues are difficult and/or costly to solve and implement. Finally, the crossbar switch may become weighty at large capacity. For example a typical Input/Output harness (connecting input and output units) may weigh 100 lbs. or more.

Thus, a need has long existed for a switching architecture that provides a high information rate while minimizing the size, weight, and power of the switch and providing a high degree of reliability.

SUMMARY OF THE INVENTION

The present invention provides a ring-bus transition for switching signals between inputs and outputs. The ring-bus transition receives signals from at least two inputs. Each input is coupled to a demodulator and each demodulator is coupled to a communication ring. The communication ring is coupled to a bridge which bridges the signals onto a communication bus. The communication bus is coupled to a number of output processors.

A commercial embodiment of the system may include 50 inputs separated into groups of five, each group forming the nodes of a ring. Thus, the system includes ten rings which are then bridged onto a single bus. The bus broadcasts the data from all of the rings to each of the fifty outputs in the preferred embodiment. The outputs recognize and receive data directed to that output. Once an output receives a data signal, the signal is stored in a memory queue. The signal may then be outputted in the order it arrived or in some other order based on a priority signal.

Additionally, each communication ring may have a connection from the bridge to the first of the inputs connected to each communication ring. Each input may then compare the signal originally coupled to the communication ring with a received signal from the communication ring. If the signals do not match, the input may re-transmit the signal or transmit an error message.

These and other features of the present invention are discussed or apparent in the following detailed description of the preferred embodiments of the invention.

DETAILED DESCRIPTION OF THE PREFERRED EMBODIMENTS

Figure 1:
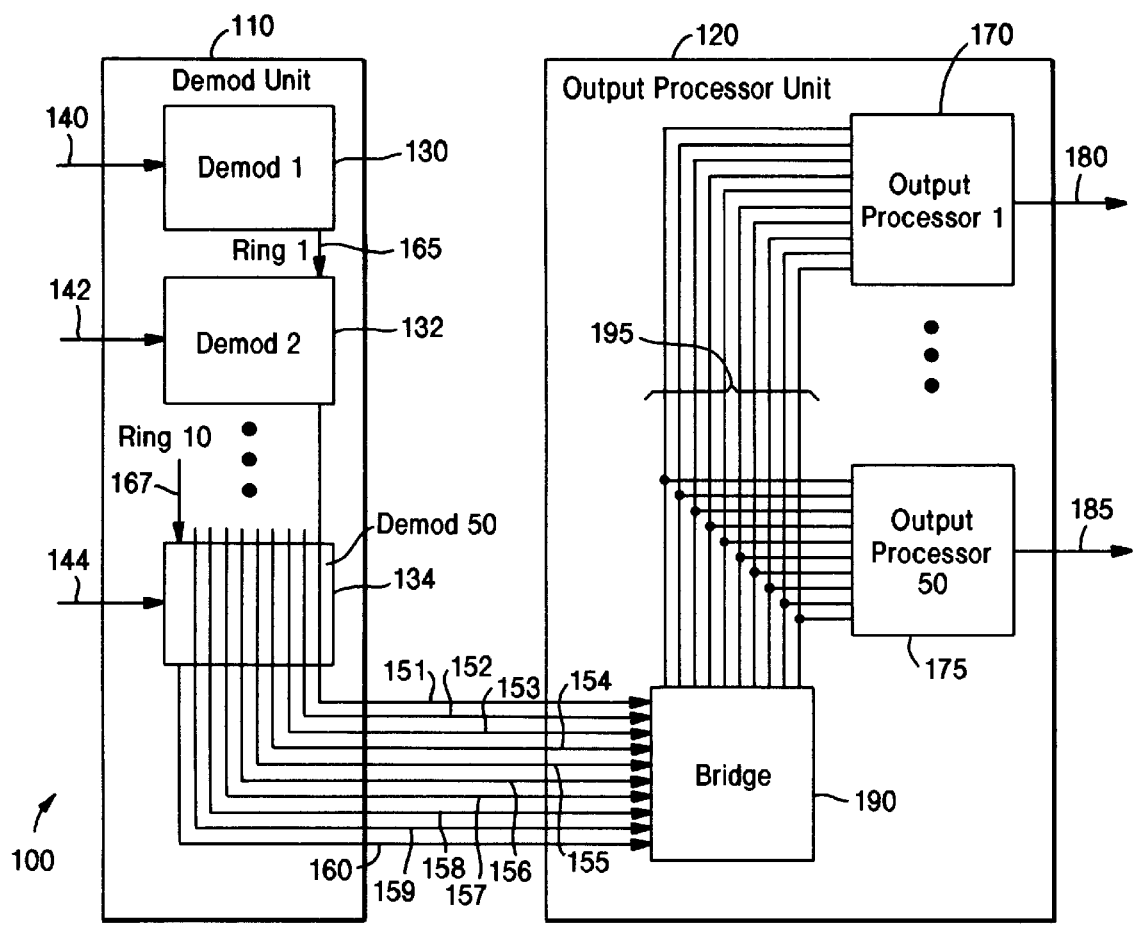
FIG. 1 illustrates the preferred embodiment of a ring-bus transition 100 of the present invention.

FIG. 1 illustrates the preferred embodiment of a ring-bus transition 100 of the present invention. The ring-bus transition 100 includes a demod unit 110 and an output processor unit 120. The demod unit 110 includes a number of demods 130–134. The present example includes 50 demods of which demod 1 130, demod 2 132 and demod 50 134 are shown. Each demod is associated with an input 140–144 as shown. For example, demod 1 130 is associated with input 1 140. While the present example includes 50 demods, the number of demods is variable. This allows the system to be scaled downward or upward as required.

The ring-bus transition 100 also includes rings 1–10 151–160. Each demod is connected to only one of the rings, and more than one demod may be connected to each ring. In this example, five demods are connected to each ring. For example, demod 1 130 and demod 2 132 (as well as demods 3,4, and 5) are connected to ring 1 151 and only to ring 1 151. Similarly, demods 6–10 (not shown) are connected to ring 2 152; demods 11–15 (not shown) are connected to ring 3 153; demods 16–20 (not shown) are connected to ring 4 154; demods 21–25 (not shown) are connected to ring 5 155;

demods 26–30 (not shown) are connected to ring 6 156; demods 31–35 (not shown) are connected to ring 7 157; demods 36–40 (not shown) are connected to ring 8 158; demods 41–45 (not shown) are connected to ring 9 159; and demods 46–49 (not shown) and demod 50 134 are connected to ring 10 160. The number of demods connected to each ring may be varied downward of upward as allowed by the bandwidth of the ring.

The demods connected to each ring are connected sequentially. Thus, demod 1 140 is connected to demod 2 142 by connection 1 165. Demod 2 142 is connected by a similar connection to demod 3 (not shown) which is connected to demod 4 (not shown) which is connected to demod 5 (not shown). Additionally, demod 9 (not shown) is connected to demod 10 144 by connection 10 167.

In operation, electrical signals may be coupled from the inputs to a demod and then sent over a ring to the output processor unit 120. For example, an electrical signal may travel via the input 140 to the demod 1 130. The demod 1 130 then demodulates the signal either to baseband or to some intermediate frequency. The demodulated signal is then passed to the ring 1 151. The signal travels over ring 1 151, in sequence, to demod 2 132, demod 3 (not shown), demod 4 (not shown), demod 5 (not shown) and then to the output processor unit 120. Thus, each demod except for demod 1 130 retransmits received signals at least one demod on the ring 1 151.

In addition to retransmitting received signals, each demod may also couple its own signal onto the ring 1 151. Thus, ring 10 151 must have sufficient bandwidth to support transmission of signals from each of the demods 1–5 simultaneously. The ring 10 may employ, for example, a Time Division Multiple Access (TDMA) system. For example, the TDMA system may form successive time slots and allow transmission from each demod only during certain time slots.

In the preferred embodiment, each of the rings 1–10 151–160 is connected to five demods and the output processor 120. The signals received from each input of the demod unit 110 are demodulated and then sent over one of the rings to the output processor unit 120.

The output processor unit 120 includes a bridge 190, a bus 195 and a number of output processors. A commercial embodiment of the output processor unit 120 may include 50 output processors of which an output processor 1 170 having an output 180 and an output processor 50 175 having an output 185 are shown. While the present example includes 50 output processors, the number of output processors is variable. This allows the system to be scaled downward or upward as desired. Each output processor is associated with an output. For example, output processor 170 is associated with the output 180.

The bridge 190 bridges the signals carried by the rings 1–10 151–160 onto the bus 195. The bus 195 is connected to each output processor 180–185. Each output processor 180–185 receives signals from the bus 106 and generates an output. For example, output processor 1 170 receives signals from the bus 195 and forms output 180.

Figure 2:
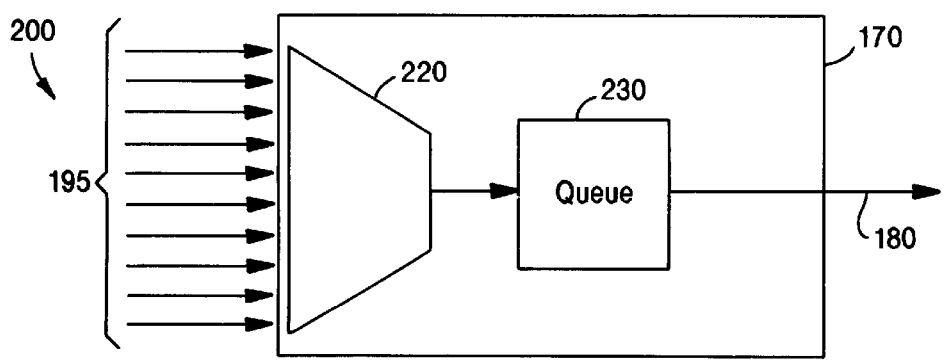
FIG. 2 illustrates the structure 200 of the output processor 170.

FIG. 2 illustrates the structure 200 of the output processor 1 170. Each output processor in FIG. 1 may share a similar structure. The output processor 170 includes a multiplexor 220 and a memory queue 230. The multiplexor 220 is connected to the bus 195. The multiplexor 220 mulitplexes a signal transmitted by the bus 195 into a serial signal which is transmitted to the memory queue 230. The memory queue 230 stores signals received from the multiplexor 220 and then transmits the signals to the output 180. The signals may be transmitted from the memory queue 230 to the output 180 sequentially or may be transmitted based on a determined signal priority.

Turning again to FIG. 1, each output processor 1–50 may read the signal provided by each ring 1–10 151–160 at the same time. For example, output processor 1 170 and output processor 50 175 may receive the signal from ring 1 151 at the same time. The output processors receiving the signal may then transmit the signal to different users at the same time.

The ring-bus transition 100 thus provides multi-casting capability to all 50 output processors at the same time. The output processors are preferably implemented with memory queues using a determined signal priority, so that the multi-cast signal may be marked as high priority and transmitted immediately. If the output processors are implemented with memory queues using sequential transmission, a small time lag time exist between the recipients of the multi-cast.

In the preferred embodiment, the inputs of the demods may be electrically connected to uplink receiving antennas and the outputs of the output processors may be electrically connected to downlink transmitting antennas. The preferred embodiment thereby may provide reduced weight due to reduced electronics and greatly reduced inter-unit harnessing (which may yield a weight savings of 100 lbs. or more); reduced software (quantity and complexity); reduced power in some instances (possibly hundreds of watts); increased performance; increased multi-cast capability (increased sales possible); higher reliability (i.e., increased fault tolerance); and better scalability.

The preferred embodiment may also be expressed more generally as follows. Data from "producers" (e.g., uplinks) is placed on a ring. Data flows around the ring until it reaches a bridge placed in the output unit. The bridge broadcasts the data to all "consumers" (e.g., downlinks). Bandwidth may be increased by increasing the number of ring-bus pairs. Multiple busses may be multiplexed at each output module. The preferred embodiment thus combines two different approaches ("ring" and "bus") in a manner which benefits switching, especially in satellite switch implementations.

Figure 3:
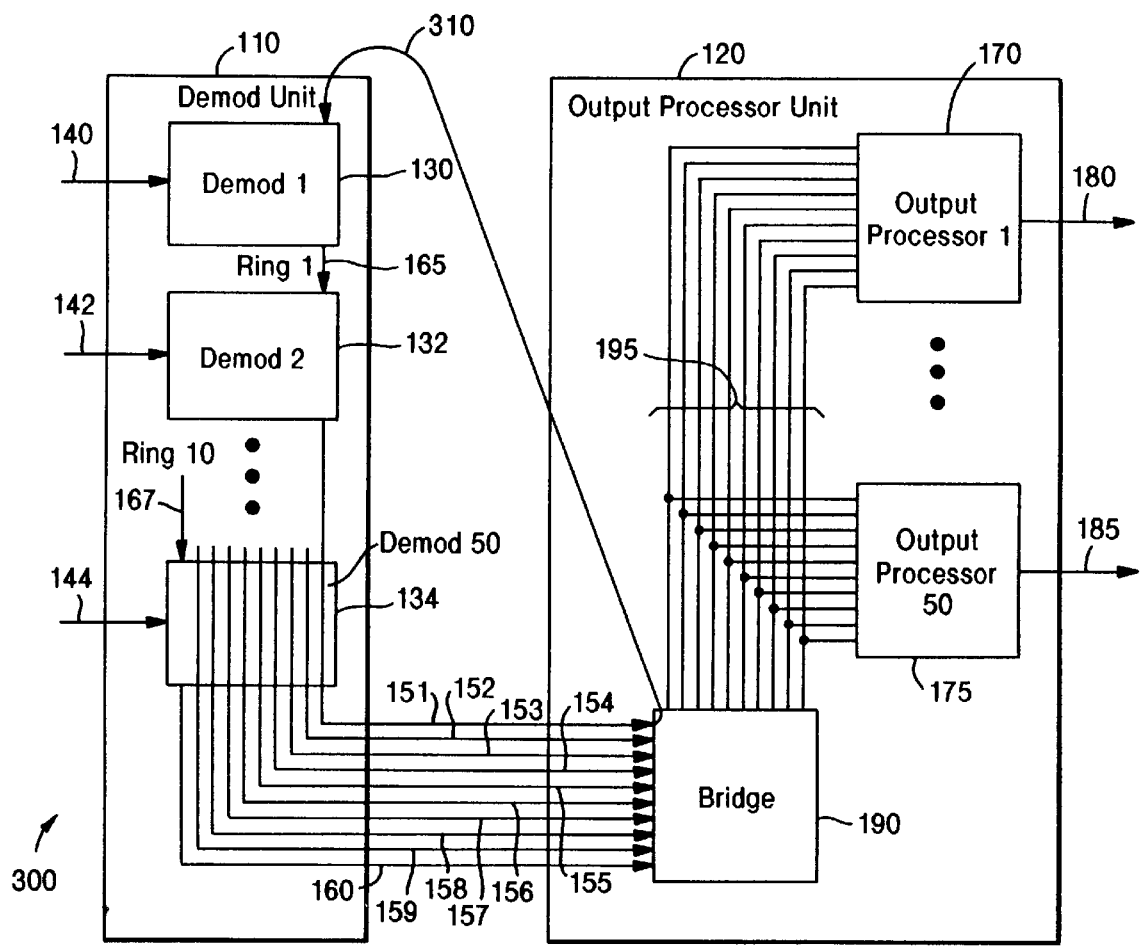
FIG. 3 illustrates a modified ring-bus transition 300.

FIG. 3 illustrates a modified ring-bus transition 300. The modified ring-bus transition 300 may be formed by the addition of a closed-loop connection for each ring 1–10 151–160 of the ring-bus transition 100 of FIG. 1. For example, a closed-loop connection 310 may be added to ring 1 151. The closed loop connection joins the bridge 190 and demod 1 130, the first demod in the ring sequence of ring 1 151. Closing the loop for ring 2 152 entails forming an electrical connection between the bridge 190 and demod 6 (not shown) the first demod in the ring sequence of ring 2 152. Similarly, in the modified ring-bus transition 300, each of the rings 1–10 151–160 is closed by an electrical connection between the bridge 190 and the first demod in the ring sequence.

In operation, the signals transmitted by each demod proceed around the ring until the signals return to the transmitting demod where the signal is removed. For example, signals transmitted by demod 1 130 are transmitted in sequence to demod 2 132, demod 3 (not shown), demod 4 (not shown), demod 5 (not shown), the bridge 190 and then back to demod 1 130.

When each signal is first transmitted by the demod, a copy of the signal is stored in a memory at the demod. When the signal returns to the originating demod, the received signal is compared with the transmitted signal which has been stored in memory. A comparator may be used to compare the two signals. If the received signal matched the transmitted signal, then the signal has traveled successfully around the ring and the demod continues with the transmission of the next signal. If the received signal does not match the transmitted signal, then an error has occurred. When a demod determines that an error has occurred, the demod may re-send the transmitted signal or send an error message. The closed-loop connection thus provides for error checking and fault tolerance in the system.

Figure 4:
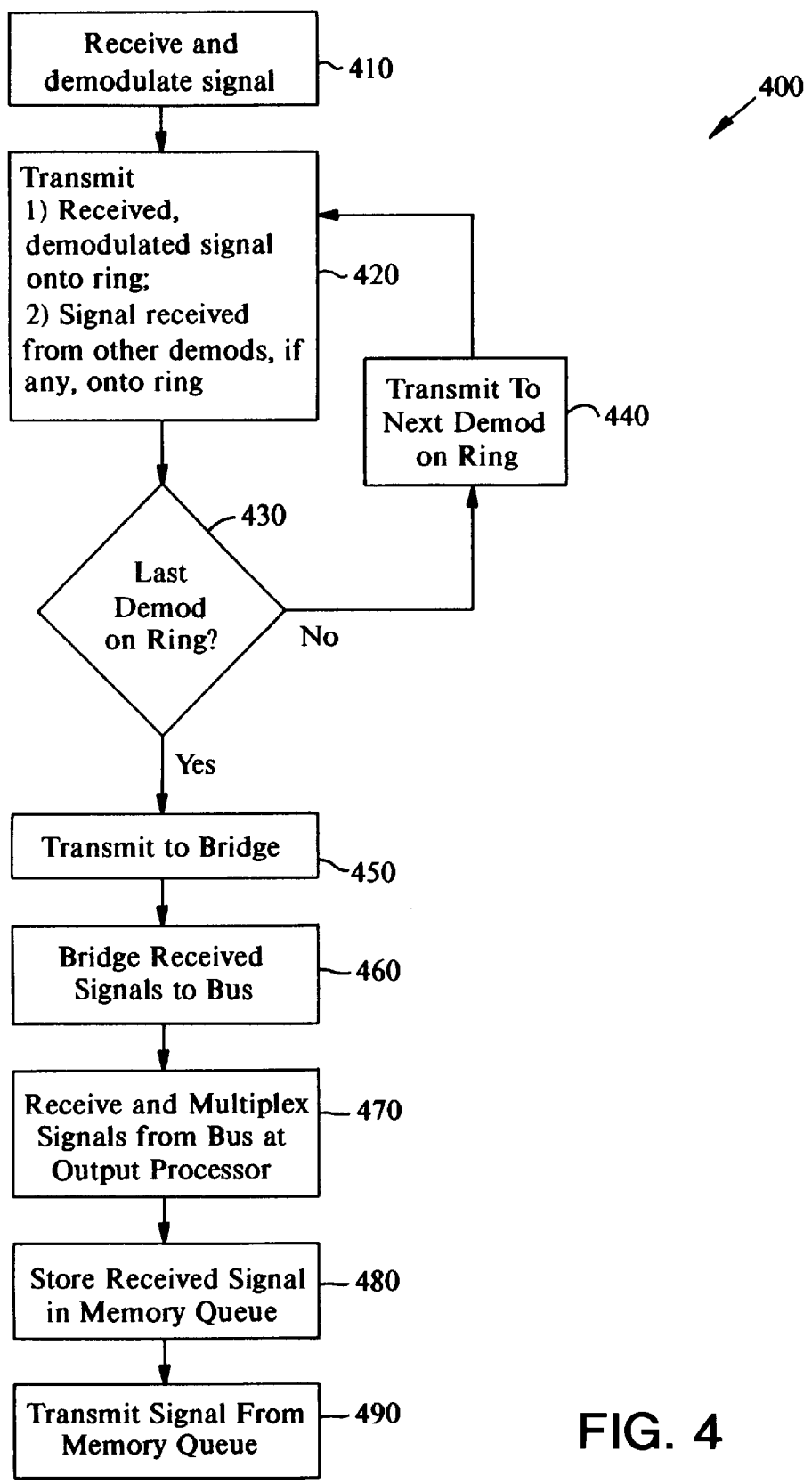
FIG. 4 illustrates a flowchart 400 of the operation of the ring-bus transition 100.

FIG. 4 illustrates a flowchart 400 of the operation of the ring-bus transition 100. First, at step 410, a signal is received and demodulated by one of the 50 demods in the demod unit 110 of the ring-bus transition 100. Next, the demod transmits the received, demodulated signal onto the ring. The demod also transmits any signal received from another, upstream demod onto the ring. If the demod is a the first demod in the ring sequence, the demod will not have received a signal from another, upstream demod. If the demod is not the first demod in the ring sequence, the demod will have received a signal from at least one other upstream demod.

Next, at step 430, it is determined if the demod is the last demod in the ring sequence. If the demod in not the last demod in the ring sequence, the flowchart proceeds to step 440 and the demod transmits to the next demod in the ring sequence. If the demod is the last demod in the ring sequence, the flowchart proceeds to step 450 and the demod transmits to the bridge 190.

Next, at step 460, the bridge 190 bridges the received signals from the rings 1–10 151–160 onto the bus 195. Next, each of the 50 output processors receive the signals carried by the bus 195. If the signals carried by the bus 195 are destined for a specific output processor, the output processor multiplexes the signals out of the bus 195. At step 480 the signal that has been multiplexed out of the bus 195 is stored in the memory queue 230 of the output processor. Finally, at step 490, the signal stored in the memory queue is transmitted to the output of the output processor.

Figure 5:
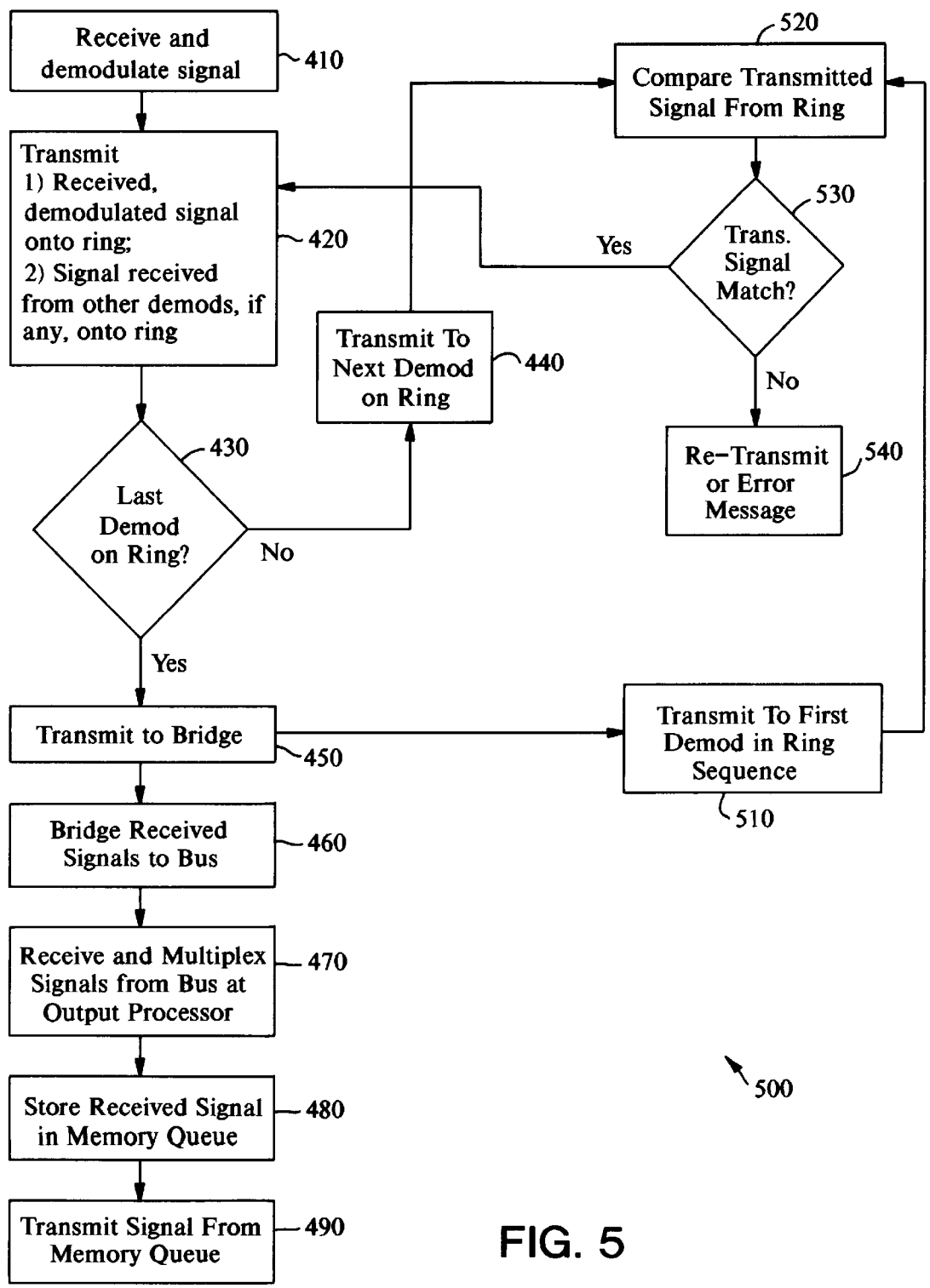
FIG. 5 illustrates a flowchart 500 of the operation of the modified ring-bus transition 300.

FIG. 5 illustrates a flowchart 500 of the operation of the modified ring-bus transition 300. The flowchart 400 of FIG. 4 remains largely unchanged but steps 510–540 have been added and the step sequence has been slightly re-arranged. Beginning with step 450, at step 450, each ring is transmitted to the bridge 190. At in FIG. 4, the flowchart proceeds to step 460 and the signal is bridged to the bus 195. Additionally, from step 450, the signal received from each ring is transmitted to the first demod in the ring sequence for that ring at step 510.

At step 520, the demod receives the signal from the ring that the demod had originally transmitted to the ring. The demod compares the signal from the ring with the transmitted signal at step 530. If the signal from the ring and the transmitted signal do not match, the demod re-transmits the originally transmitted signal or sends an error message at step 540. If the signal from the ring and the transmitted signal match, the flowchart proceeds to step 420 and the demod transmits the new received, demodulated signal as well as the other signals on the ring.

After step 440 (that is, if at step 430 the present demod is not the last demod on the ring) when the signals are transmitted to the next demod on the ring, the demod compares the originally transmitted signal with the signal on the ring at step 520.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A ring-bus transition for coupling signals from at least one input to at least one output, the transition comprising:
    at least two inputs;
    at least two demods, each demod coupled to an input;
    a communication ring coupled to said demods connecting said demods in series to form a communication ring sequence;
    a bridge coupled to said communication ring;
    a communication bus coupled to said bridge; and
    at least one output processor coupled to said communication bus.

2. The ring-bus transition of claim 1 wherein at least one of said output processors includes a multiplexor coupled to a memory queue.

3. The ring-bus transition of claim 2 wherein said signals received from said communication bus are stored in said memory queue prior to being outputted.

4. The ring-bus transition of claim 3 wherein said signals are output in the order they entered said memory queue.

5. The ring-bus transition of claim 3 wherein said signals are output based on a priority signal.

6. The ring-bus transition of claim 1 wherein said inputs are coupled to a satellite uplink antenna and said outputs are coupled to a satellite downlink antenna.

7. The ring-bus transition of claim 1 further including a closed-loop connection between said bridge and the first demod in said communication ring sequence.

8. The ring-bus transition of claim 7 wherein each of said demods includes a memory for storing a transmitted signal and a comparator for comparing the transmitted signal with a signal received from said communication ring.

9. The ring-bus transition of claim 1 further including at least one additional communication ring coupled to at least one additional demod, each demod coupled to an additional input, wherein said bridge is additionally coupled to said additional at least one communication ring.

10. The ring-bus transition of claim 1 wherein at least two output processors output the same input signal.

11. A method for directing signals from at least one input to at least one output comprising the steps of:
    receiving signals at at least two inputs;
    coupling signals from said at least two inputs to at least two demods, each demod coupled to an input;
    coupling signals from said at least two demods to a communication ring in series to form a communication ring sequence;
    bridging said signals on said communication ring onto a communication bus;
    coupling said signals from said communication bus to at least one output; and
    outputting said signals.

12. The method of claim 11 wherein said coupling step comprises the step of coupling said signals from said communications bus to a multiplexor coupled to a memory queue within said at least one output.

13. The method of claim 12 wherein said coupling step further comprises the step of storing said signals coupled from said communication bus in said memory queue prior to outputting.

14. The method of claim 13 wherein said outputting step comprises outputting the signals stored in said memory queue in the order the signals were entered in said memory queue.

15. The method of claim 13 wherein said outputting step comprises outputting the signals in said memory queue based on a priority signal.

16. The method of claim 11 wherein:

said receiving step comprises receiving signals at at least two inputs from a satellite uplink antenna; and said outputting step comprises outputting signals to a satellite downlink antenna.

17. The method of claim 11 further comprising the step of coupling said signals from the last demod in said communication ring sequence to the first demod in said communication ring sequence.

18. The method of claim 17 further comprising the steps of:

storing the signal coupled to said communication ring at the time the signal is coupled to said communication ring; and comparing the stored signal with the signal coupled from said communication ring to said demod at a later time.

19. The method of claim 11 further comprising the steps of:

receiving signals at at least one additional inputs;

coupling signals from said at least one additional inputs to at least one additional demod, each additional demod coupled to an additional input;

coupling signals from said at least one additional demod to at least one additional communication ring; and bridging said signals on said at least one additional communication ring onto said communication bus.

20. The method of claim 11 wherein said outputting step comprises outputting signals from a single input at at least two outputs.

* * * * *